G. R. LAWTON.
AUTOMATIC CHICKEN FEEDER.
APPLICATION FILED MAR. 28, 1918.

1,315,316.

Patented Sept. 9, 1919.
2 SHEETS—SHEET 1.

G. R. Lawton
INVENTOR:
BY N. S. Hill
ATTORNEY.

G. R. LAWTON.
AUTOMATIC CHICKEN FEEDER.
APPLICATION FILED MAR. 28, 1918.

1,315,316.

Patented Sept. 9, 1919.
2 SHEETS—SHEET 2.

G. R. Lawton
INVENTOR:

BY H. S. Hill

ATTORNEY.

UNITED STATES PATENT OFFICE.

GEORGE RANSOM LAWTON, OF WATKINS, NEW YORK.

AUTOMATIC CHICKEN-FEEDER.

1,315,316. Specification of Letters Patent. Patented Sept. 9, 1919.

Application filed March 28, 1918. Serial No. 225,263.

*To all whom it may concern:*

Be it known that I, GEORGE RANSOM LAWTON, a citizen of the United States, residing at Watkins, in the county of Schuyler, State of New York, have invented a new and useful Automatic Chicken-Feeder; and I do hereby declare the following to be a full, clear, and exact description of the invention, such as will enable others skilled in the art to which it appertains to make and use the same.

The present invention relates to a time controlled mechanism for supplying feed at predetermined periodic intervals to chickens or the like, thereby insuring regularity of feeding and avoiding the close personal attention which would otherwise be necessary to get the same results.

Among the objects of the invention are to provide an automatic chicken feeding device which is comparatively simple and inexpensive in its construction, which can be set to discharge a predetermined amount of grain or the like at certain intervals of time, which will only require attention about once a week, and which will scatter the food as it is discharged.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Corresponding and like parts are referred to in the following description and indicated in all the views of the drawings by the same reference characters.

Figure 1:
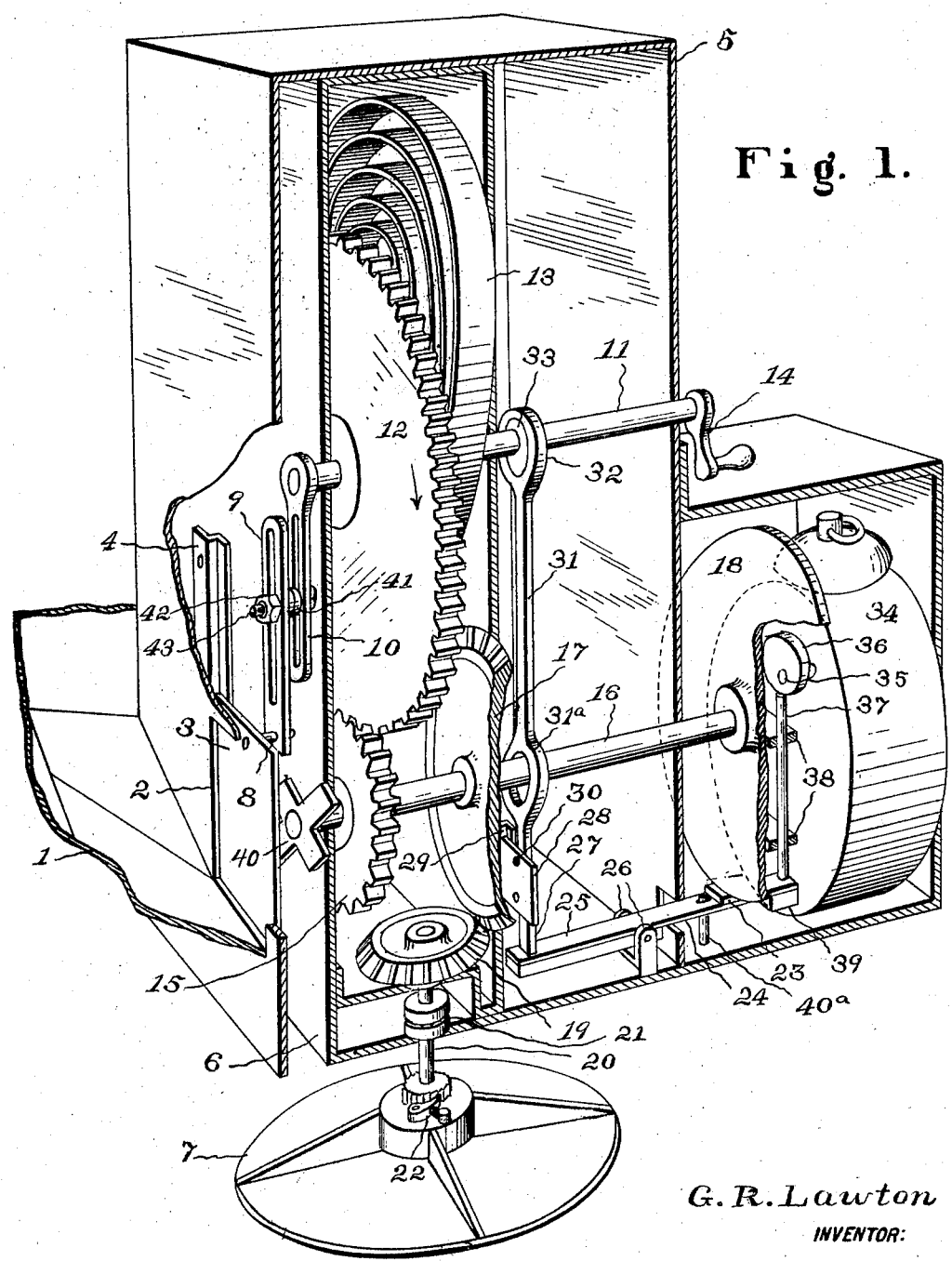
Figure 1 is a sectional perspective view of an automatic chicken feeder constructed in accordance with the invention.
Figure 2:
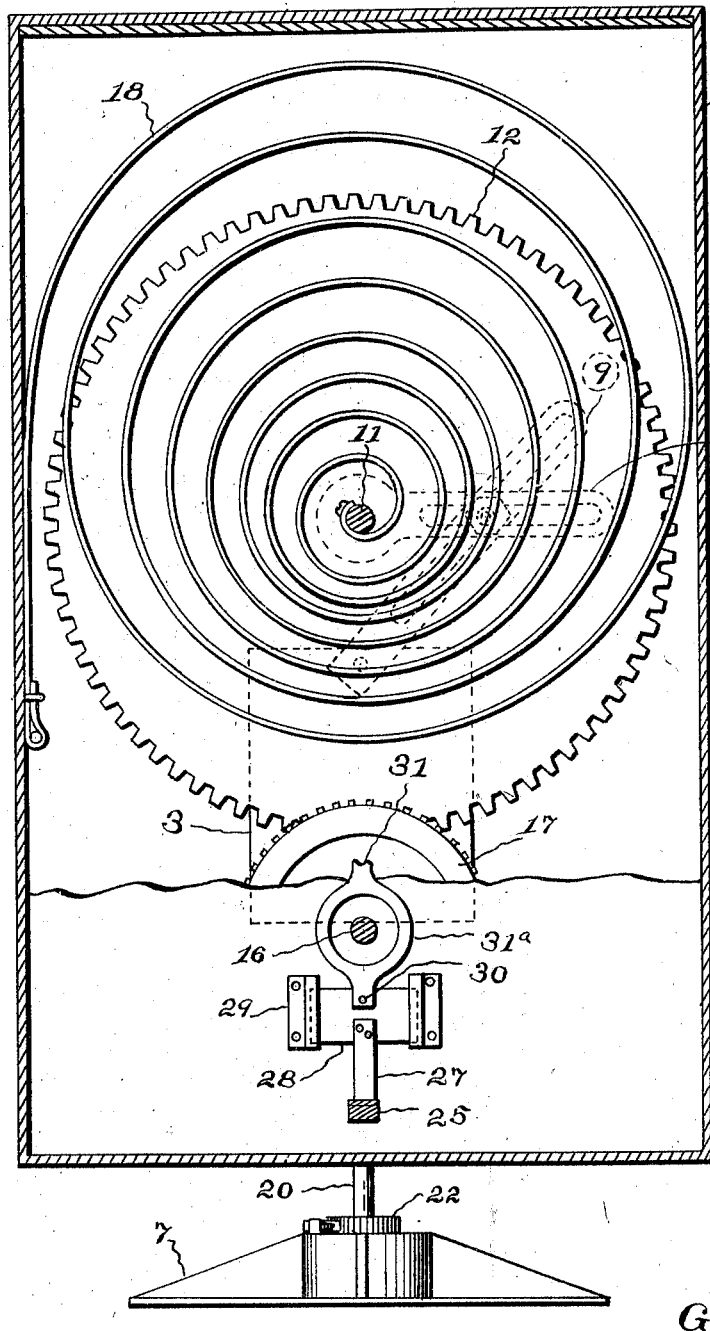
Fig. 2 is a vertical sectional view showing the main spring at the upper portion thereof and the brake lever controlling plunger at the lower portion thereof.

Referring to the drawings, which illustrate one embodiment of the invention, the numeral 1 designates a fragmentary portion of the inclined bottom of a hopper which is of sufficient size to hold a week's supply of grain or other feed. The contents of the hopper are discharged in predetermined quantities and at periodic intervals through an opening 2 which is controlled by a sliding gate 3, said gate operating within the guides 4. A casing 5 within which the mechanism for automatically controlling the movements of the gate 3 is mounted, is arranged at the side of the hopper, and within the casing is a vertical wall 6 which has a substantially spaced and parallel relation to the hopper, the contents of the hopper being discharged through the opening 2 into the space between the hopper and the said wall or partition 6 and dropping through the said space into engagement with the spreader 7.

The gate 3 of the hopper is pivotally connected by a pin 8 to a slotted link 9 which has an adjustable pivotal connection with the crank arm 10 at the end of a horizontally disposed main shaft 11. This main shaft is provided with a large gear wheel 12 and has a spiral spring 13 connected thereto. One end of the shaft projects through the casing where it is provided with a crank handle 14 by means of which the shaft can be manually rotated to wind the spring 13 when that becomes necessary.

The gear wheel 12 on the main shaft 11 meshes with a pinion 15 on a countershaft 16 which is arranged under the main shaft, said countershaft being also provided with a bevel gear 17 and a brake wheel 18. The bevel gear 17 meshes with a bevel pinion 19 at the upper end of a vertical shaft 20 which extends through the bottom of the casing 5 and has the flanged spreader 7 swiveled on the lower end thereof. A suitable bearing 21 supports the vertical shaft 20, permitting it to rotate freely, but holding it against longitudinal movement. A pawl and ratchet connection 22 is provided between the said shaft 20 and the spreader 7 so that the spreader can continue to spin or rotate after the shaft has come to a stop, thereby relieving the mechanism of all unnecessary strain when the device is stopped, and insuring an effective spreading of the feed or grain.

The lower periphery of the brake wheel 18 is normally engaged by a brake shoe 23 which is carried by a spring strip 24 projecting from the end of a horizontal lever 25 which is pivotally mounted between the upstanding ears 26. A plunger 27 normally presses downwardly upon the swinging end of the lever 25 and holds the brake shoe 23 in a yielding engagement with the periphery of the brake wheel 18, thereby locking the mechanism against movement. This plunger 27 is shown as carried by a slide 28 which is vertically movable within guides 29, said slide being pivotally connected at 30 to the lower end of a link 31. This link is provided at an intermediate point in its length with a loop 31$^a$ which provides a clearance space for the countershaft 16, the upper end of the link being formed with an eye 32 which loosely receives a cam disk 33 on the main shaft 11. The larger side of the cam disk 33 normally projects downwardly from the main shaft, thereby holding the brake controlling plunger 27 in a depressed position with the spring strip 24 under tension and the shoe 23 in a firm engagement with the periphery of the brake shoe 18.

An eight day alarm clock 34 is mounted adjacent the brake wheel 18, said clock being of the conventional construction, and the shaft 35 of the alarm mechanism being provided at the back of the clock with an offset or cam member 36 which always projects upwardly when the alarm is not in operation. A brake releasing plunger 37 is mounted under the cam member 36 of the alarm clock, being slidable within suitable guides 38, and the lower end thereof resting upon the end of the spring strip 24 of the brake lever. The clock can be set in the usual manner to have the alarm sound at any desired time. Upon the sounding of the alarm the rotation of the cam member 36 forces the plungers 37 downwardly, thereby flexing the spring strip 24 and releasing the shoe 23 from engagement with the brake wheel 18. The main spring 13 will then put the mechanism into operation, and the initial rotation of the main shaft 11 will move the cam 33 a sufficient amount to raise the brake lever controlling plunger 27 and permit the brake lever 25 to swing under the action of a weight 39 and hold the brake shoe 23 out of engagement with the wheel 18. The main shaft 11 will make one complete revolution, which will result in opening and closing the gate 3 of the hopper and discharging a predetermined quantity of feed, the exact amount of feed which is discharged at each opening and closing of the gate depending upon the degree to which the gate is opened. The feed which is discharged through the gate opening 2 of the hopper will be prevented from clogging by an agitator 40 applied to the end of the counter-shaft 16, and will be scattered by the flanged spreader 7, thereby supplying it to the poultry or chickens in the most effective and satisfactory manner. As soon as the main shaft 11 has completed one revolution the cam member 33 thereof will force the brake plunger 27 down to its original position, thereby swinging the brake lever 25 against the action of the weight 39 and causing the shoe 23 to engage the brake wheel 18. The mechanism is thus brought to a sudden stop, although the flanged spreader 7 may continue to spin owing to the fact that it is swiveled on the lower end of the vertical shaft 20 and has a pawl and ratchet connection 22 therewith. A guide pin 40$^a$ projects upwardly from the bottom of the casing 5 and passes loosely through an opening in the spring strip 25 of the brake lever, thereby guiding the spring strip in its up and down movements and holding it against any lateral displacement which might possibly be occasioned by engagement of the brake shoe with the brake wheel.

Figure 3:
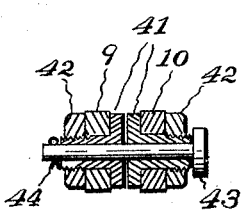
Fig. 3 is an enlarged detail sectional view showing the adjustable connection between the crank arm of the main shaft and the arm connected to the gate of the hopper.

The adjustable connection between the crank arm 10 of the main shaft 11 and the link 9 of the feed gate is illustrated in detail by Fig. 3. The crank arm and link are both slotted, each of them being provided with a tubular bolt 41 which can be locked in any adjusted position upon the respective member by tightening a clamping nut 42. A pivot pin 43 extends through the two tubular bolts or bearings 41, being held in position in any manner as by means of a cotter-pin 44. With this construction it will be obvious that by adjusting the position of the tubular bolts or bearings 41 upon the respective members the degree to which the feed gate 3 is opened can be increased or decreased, as desired, thereby regulating the quantity of feed or grain which is discharged at each actuation of the device. Where an eight day alarm clock is employed, a sufficient quantity of grain or feed to last a week can be placed in the hopper, and the device only requires attention once a week. The alarm can be set to sound every twelve hours, and the chickens or poultry will soon learn to come at the sound of the alarm. The cam or offset member 36 of the alarm mechanism normally projects upwardly from the shaft 35, and the alarm always stops with the cam member in this position. For this purpose any suitable mechanism such as that embodied in the alarm clock disclosed in Patent No. 1,034,141, which was granted July 30, 1912, to W. E. Porter, can be used. With the use of this device regularity can be obtained in the feeding of poultry without the necessity of close personal attention, and in order to obtain the best results in raising poultry it is necessary that feed shall be supplied at regular intervals of time and in uniform quantities.

Having thus described the invention, what I claim as new and desire to secure by Letters Patent, is:—

1. A device of the character described, including a hopper, a gate for the hopper, time controlled means for automatically opening and closing the gate at predetermined intervals of time, and means for regulating the degree to which the gate opens.

2. A device of the character described, including a hopper, a reciprocating gate for the hopper, an operating shaft formed with a crank, a link operatively connecting the crank to the gate and having an adjustable connection with the crank to regulate the degree to which the gate opens, and means for rotating the shaft at predetermined intervals of time.

3. A device of the character described, including a hopper, a gate for the hopper, a drive shaft provided with a slotted crank portion, a link connected to the gate and formed with a slot, bushings adjustably fitted within the slotted portions of the crank and link, a pivot pin extending through the bushings, and means for rotating the shaft at predetermined intervals of time.

4. A device of the character described, including a hopper having a discharge opening, a gate for the discharge opening, walls forming a passage into which the material is discharged from the hopper, an agitator in the passage, a spreader receiving the material of the hopper after it has gone through the passage, and time controlled means for automatically operating the gate, agitator and spreader at predetermined intervals of time.

5. A device of the character described, including a hopper, a gate for the hopper, a main drive shaft having an operative connection with the gate for opening and closing the same, a countershaft geared to the main shaft, a brake wheel on the countershaft, a brake lever pivoted between its ends and provided at one end with a spring strip, a shoe carried by the spring strip and arranged for engagement with the break wheel, a plunger engaging the other end of the brake lever for holding the brake shoe normally in operative position, cam means controlled by the main shaft for moving the plunger into operative position when the gate is closed, and time controlled means for forcibly flexing the spring strip of the brake lever to release the brake shoe.

6. A device of the character described, including a hopper, a gate for the hopper, a main drive shaft having an operative connection with the gate for opening and closing the same, a countershaft geared to the main shaft, a brake wheel on the countershaft, a brake lever pivoted between its ends and provided at one end with a spring strip, a brake shoe mounted upon the spring strip, a plunger engaging the other end of the brake lever for moving the same to hold the shoe in engagement with the brake wheel, a cam on the main shaft, a link controlled by the cam and operatively connected to the plunger for holding the plunger in operative position when the gate is closed, a plunger engaging the spring strip of the lever, and time controlled means for automatically actuating the plunger to flex the spring strip and release the brake shoe.

7. A device of the character described including a hopper formed with a discharge opening, a gate for the said opening, a main drive shaft operatively connected to the gate for opening and closing the same, a countershaft geared to the main shaft, an agitator applied to the countershaft and arranged opposite the discharge opening of the hopper to prevent clogging of the material passing through the said opening, a spreader geared to the countershaft and receiving the material from the agitator, and time controlled means for automatically rotating the shafts at predetermined intervals of time.

8. A device of the character described including a hopper formed with a discharge opening, a gate for the discharge opening, walls forming a downwardly extending passage leading from the discharge opening of the hopper, a drive shaft operatively connected to the gate for opening and closing the same, a countershaft geared to the drive shaft, an agitator applied to the countershaft and arranged within the before-mentioned downwardly extending passage to prevent clogging of the material therein, a spreader upon which the material drops from the discharge end of the passage, and means for operating the shaft at predetermined intervals of time.

In testimony whereof I have signed my name to this specification in the presence of two subscribing witnesses.

GEORGE RANSOM LAWTON.

Witnesses:
G. W. BURRELL,
DELPHINE BURRELL.